Sept. 4, 1934. R. MAROGG Re. 19,304

CLAMPING DEVICE

Original Filed Aug. 13, 1932

INVENTOR
RICHARD MAROGG
BY Curtis & Wood
ATTORNEYS

Reissued Sept. 4, 1934

Re. 19,304

UNITED STATES PATENT OFFICE 19,304

CLAMPING DEVICE

Richard Marogg, Troy, N. Y.

Original No. 1,947,607, dated February 20, 1934, Serial No. 628,767, August 13, 1932. Application for reissue May 29, 1934, Serial No. 728,194

12 Claims. (Cl. 144—289)

One of the objects of my invention is the provision of a clamping device in which the clamping jaws are freely movable towards each other to bring them into engagement with the work, together with associated means for normally preventing separating movement for each other and associated means for applying clamping pressure to the clamping jaws when they have been brought into engagement with the work.

With the ordinary clamping device, two clamping jaws are provided and screw-threaded means are provided for moving the one jaw toward the other. A considerable amount of time is consumed, however, in actuating the screw to move the one jaw toward the other sufficient to bring it into engagement with the work and conversely to move the clamping jaw away from the work. My invention avoids the waste of time incident to the usual construction in bringing the clamping jaws into engagement with the work by the provision of means by which the jaws may be quickly moved into position where clamping pressure may be applied and then the pressure applied by slowly moving an actuating member, and in which, when the clamping pressure is released, the clamping jaws may be quickly moved away from each other.

Furthermore, with the ordinary clamping device, one of the clamping jaws is rotatable, with the result that the application of force to the work such as is required, for example, in forming threads on a member, is likely to result in movement of the work in carrying out a desired operation thereon. In accordance with my invention, the jaws are non-rotatable with respect to each other and the foregoing difficulty is obviated.

Other objects of my invention will appear in the specification and will be particularly pointed out in the claims.

My invention will best be understood by reference to the accompanying drawing in which I have illustrated a preferred embodiment thereof and in which Fig. 1 is a perspective view of a clamping device embodying my invention and illustrating the clamping jaws in separated position;

Figure 1:
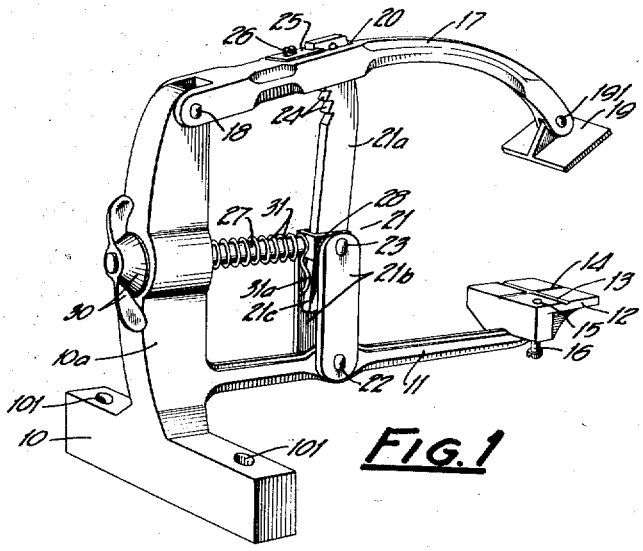

Referring to the drawing, 10 is a support provided with an arm 11 integral therewith and which is provided with a fixed jaw 12 which is preferably provided with a transverse groove 13 and a groove 14 extending longitudinally of the clamping jaw. The support 10 is preferably provided with openings 101 by which the support may be secured by screws engaging suitable tapped openings in the bench. The clamping jaw is also preferably provided with a tapped opening in which is received a screw 16 for a purpose which will more fully hereinafter appear.

In the embodiment of my invention illustrated, an arm 17 is pivotally mounted as at 18 on the support 10. The arm 17 is provided with a clamping jaw 19 pivotally mounted as at 191 on the arm and on an axis parallel to the face of the fixed clamping jaw, but not rotatable about an axis perpendicular to its clamping face. In the embodiment illustrated, the arm 17 is provided with an opening 20 through which extends one arm 21*a* of a toggle lever indicated generally at 21, the other arm 21*b* of which, in the form illustrated, comprises two links pivoted to the arm 11 as at 22, the two arms of the toggle being pivoted together as at 23. The upper end of the arm 21*a* is provided with ratchet teeth 24 cooperating with a pawl 25 which, in the embodiment illustrated, is in the form of a plate secured to the arm 17 as by a screw 26. It will be understood that the pawl may, if desired, be formed integrally with the arm.

Pressure is applied to the toggle lever and thus to the clamping jaws through a stem 27 one end of which is preferably provided with a yoke 28, the branches of which are received between the links 21*b* and the arm 21*a* and the opposite end of which passes through an opening in a vertical standard 10*a* on the support 10. The end of the stem 27 is provided with screw-threads, as at 29, which are engaged by a wing nut 30.

Figure 2:
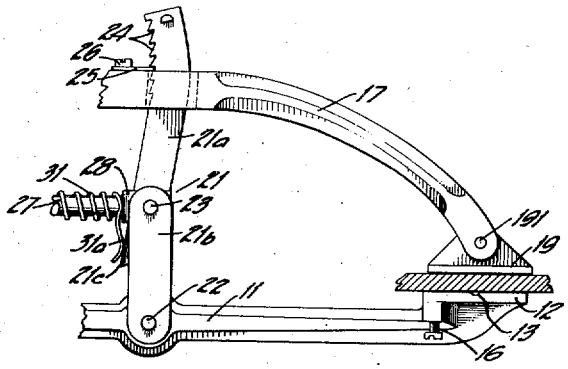
Fig. 2 is a fragmentary side elevation of a portion of the clamping device and illustrating the clamping jaws ready to be brought into clamping engagement with the work.
Figure 3:
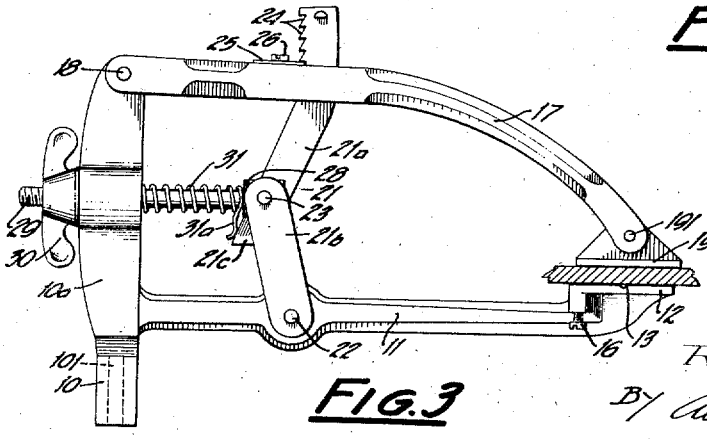
Fig. 3 is a side view illustrating the parts associated with the jaws in a position to apply clamping pressure to the jaws.

A coil spring 31 surrounding the stem 27 is interposed between the standard 10*a* and the toggle, one end 31*a* of the spring preferably engaging the end 21*c* of the arm 21*a* which extends beyond its pivot. The coil spring 21 thus tends to hold the toggle in a straightened position, as illustrated in Fig. 1, while the end 31*a* of the coil spring 31 tends to rotate the arm 21*a* in a counterclockwise direction, as viewed in Figs. 1, 2 and 3 to maintain the teeth 24 of the ratchet in engagement with the pawl 25.

The operation of my device is as follows—

Assuming that the jaws are in the separated position illustrated in Fig. 1, the work or piece to be clamped in position is placed upon the lower fixed jaw 12 and the arm 17 moved downwardly until the jaw 19 engages the upper side of the work. The arm may readly be moved downwardly inasmuch as the pawl 25 rides over the ratchet teeth 24. Then by turning the winged nut 21 to move the toggle from the approximately straight line illustrated in Figs. 1 and 2 to the position illustrated in Fig. 3, the ratchet teeth prevent the upward movement of the arm 17 and the jaw carried thereby and clamping pressure is applied to the work, the parts assuming the position illustrated in Fig. 3.

In order to release the work, the winged nut is moved sufficiently to relieve the clamping pressure on the work. Then by moving the upper end of the arm 21*a* of the toggle to the right, as viewed in Fig. 1 to release it from the pawl 25, the arm may again be raised away from the work.

It will be apparent that clamping pressure is applied to the work and is released by moving the stem 27 through a comparatively small distance by means of the winged nut 30 and that the entire operation is carried out rapidly as compared with ordinary clamping devices. Furthermore, the work is not held as rigidly in position as in applicant's device since the pivoted jaw is likely to turn when pressure is applied on the work particularly as in turning a thread or similar operation.

The parts may conveniently be arranged so that the movement of $\frac{1}{32}$ of an inch of the screw causes $\frac{1}{64}$ of an inch movement of the jaw. In other words the clamping force is about double that exerted by the ordinary clamp with the application of equal force.

By providing grooves in the clamping jaw 12, a more or less rounded member and particularly a cylindrical member may be securely clamped in the jaws without danger of its being dislodged when pressure is applied thereto. For example, a thread may be applied on a bolt without danger of the bolt being dislodged in carrying out the operation and in fact screw threads may be inserted within the groove without injury thereto.

Figure 4:
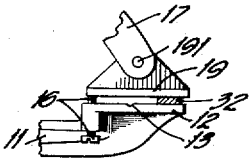
Fig. 4 is a fragmentary view illustrating a detail.

When a relatively narrow piece of work, 32, as indicated in Fig. 4 is clamped between the jaws, there would be a tendency for the jaw 19 to tilt about the work as a pivot, and the work would not be held as securely in clamping position between the jaws as would be the case if the faces of the jaws were kept in parallelism. By the provision of the screw 16 the faces of the two jaws may be maintained in parallelism by moving the upper end of the screw 16 to a position where it extends above the upper base of the jaw 12 a distance corresponding to the thickness of the work 32.

While I have described my invention in its preferred embodiments, it will be understood that the words which I have used are words of description rather than of limitation and that changes within the purview of the appended claims may be made without departing from the true scope and spirit of my invention in its broader aspects.

What I claim is:

1. In a clamping device, a fixed jaw, a movable jaw, a toggle for applying pressure to said movable jaw, associated means cooperating with said movable jaw for normally preventing movement but releasable to permit free movement thereof away from the other, and screw means for applying pressure to said toggle and thereby applying clamping pressure to said movable jaw.

2. In a clamping device, a support provided with a first arm, a clamping jaw mounted thereon, a second arm pivoted to said support, a second clamping jaw mounted on said second arm and cooperating with said first jaw, a toggle interposed between said arms, screw means for applying pressure to said toggle and thereby applying clamping pressure to said second jaw, and associated means normally preventing separating movement of said second jaw from the first jaw, said associated means being readily releasable to permit free movement of said second jaw away from the first.

3. In a clamping device, a support, a first clamping jaw mounted thereon, an arm pivoted on said support and provided with a second clamping jaw and with a transverse opening, a toggle, one arm of which is provided with ratchet teeth and passing through said opening, said first mentioned arm being provided with a pawl coacting with said ratchet teeth to permit free movement of said first mentioned arm to bring said first jaw towards said second jaw and normally prevent a separating movement thereof from the second jaw and means comprising a toggle lever for applying pressure to said arm and thereby applying clamping pressure to said second jaw.

4. In a clamping device, a support, a first clamping jaw mounted thereon, an arm pivoted on said support and provided with a second clamping jaw cooperating with said first jaw, said arm being provided with an opening, a toggle, one arm of which passes through said opening and constructed and arranged to permit free movement of said first mentioned arm in a direction to move said second jaw towards said first jaw, associated means for preventing a separating movement of said second jaw from said first jaw and means for actuating said toggle to apply pressure to said second jaw.

5. In a clamping device, a support, a fixed jaw mounted thereon, an arm pivoted to said support and provided with a second clamping jaw cooperating with said first jaw, a toggle lever interposed between said arm and said support and constructed and arranged to permit free movement of said arm in a direction to move said second jaw towards said first jaw and normally prevent separating movement thereof from said first jaw, said support being provided with a screw engageable with said toggle to actuate the same whereby clamping pressure may be applied to said second clamping jaw.

6. In a clamping device, a support, a fixed jaw mounted thereon, an arm pivoted to said support and provided with a second clamping jaw cooperating with said first jaw, a toggle lever interposed between said arm and said support and constructed and arranged to permit free movement of said arm in a direction to move said second jaw towards said first jaw and normally to prevent separating movement thereof from said first jaw, said support being provided with a screw engageable with said toggle to actuate the same and a spring interposed between said toggle and said support for normally straightening said toggle.

7. In a clamping device, a support provided with a first fixed clamping jaw, an arm pivoted to said support and provided with a clamping jaw cooperating with said first jaw, said arm being provided with an opening, a toggle lever, one arm of which passes through said opening and provided with ratchet teeth, said first mentioned arm being provided with a pawl cooperating with said ratchet teeth, spring means normally retaining the ratchet teeth of said second mentioned arm in engagement with said pawl while permitting manual release thereof, and means for applying pressure to said toggle whereby clamping pressure may be applied to said second jaw.

8. In a clamping device, a support, a first clamping jaw mounted thereon, an arm provided with a second clamping jaw and movable towards and away from said first jaw, a toggle interposed between said support and said arm, the parts being constructed and arranged to permit free movement of said arm in a direction to move said second jaw towards said first jaw, associated means for normally preventing a separating movement of said second jaw from said first jaw, and screw means for actuating said toggle to apply pressure to said second jaw.

9. In a clamping device, two pivotally connected relatively movable members, clamping jaws mounted on the respective members and movable into engagement with each other, a toggle lever co-operatively associated with said members, the parts being constructed and arranged to permit free relative movement of said members towards each other, associated means for normally preventing a separating movement of said members, and screw means for actuating said toggle lever to apply pressure to said members.

10. In a clamping device, two relatively movable members provided with respective cooperating clamping jaws, a toggle co-operatively associated with said members, screw means for applying pressure to said toggle and thereby applying clamping pressure to said jaws, and associated means normally preventing separating movement of said jaws, said associated means being readily releasable to permit free separating movement of said jaws.

11. In a clamping device, two relatively movable members provided with respective cooperating clamping jaws, a toggle co-operatively associated with said members, means for applying pressure to said toggle and thereby applying clamping pressure to said jaws, and associated means comprising said toggle for normally preventing separating movement of said jaws, said associated means being readily releasable to permit free separating movement of said jaws.

12. In a clamping device, a support, a fixed jaw mounted thereon, an arm pivoted to said support and provided with a second clamping jaw cooperating with said first jaw, means including a toggle lever for preventing separating movement of said second jaw from said first jaw and constructed and arranged to permit free movement of said arm in a direction to move said second jaw toward said first jaw, and means whereby said toggle may be actuated in a direction to apply clamping pressure to said second jaw.

RICHARD MAROGG.